Oct. 22, 1935. T. S. SKILLMAN Re. 19,741
TELEPHONE SYSTEM
Original Filed July 3, 1929 4 Sheets-Sheet 1
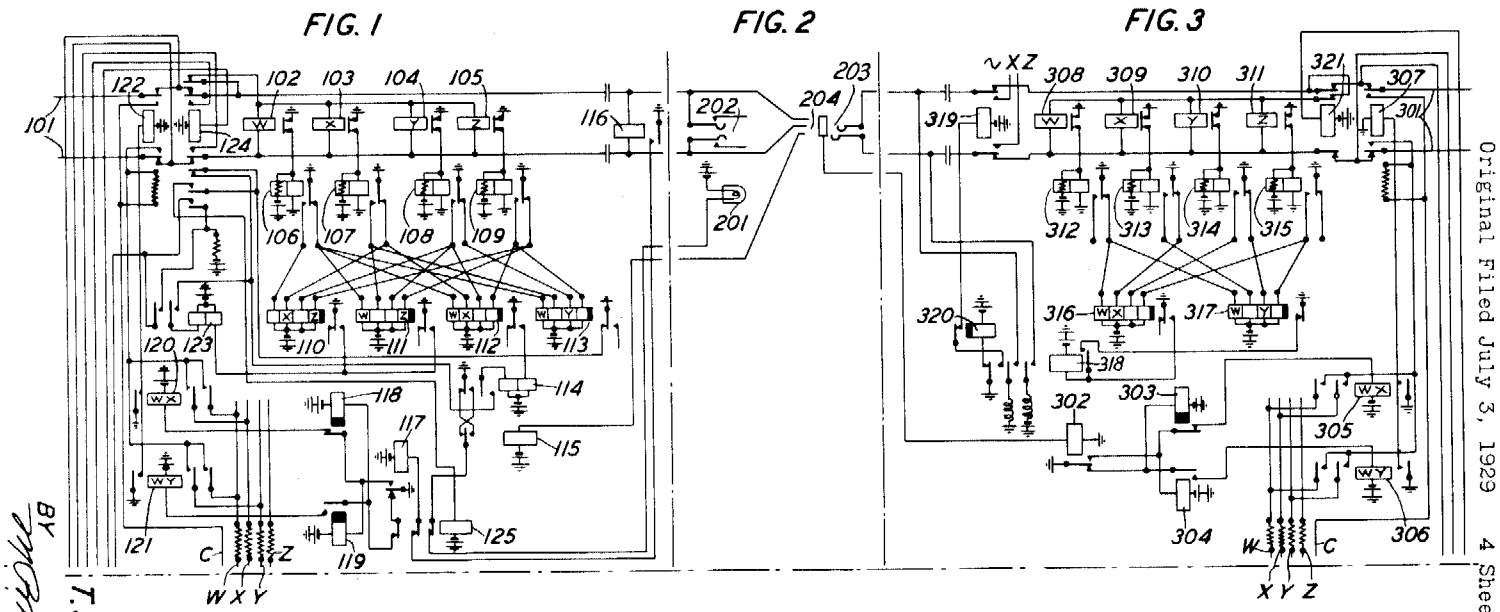
INVENTOR
T. S. SKILLMAN
BY M. A. McKenney
ATTORNEY

TELEPHONE SYSTEM

Original Filed July 3, 1929 4 Sheets-Sheet 2

INVENTOR
T. S. SKILLMAN
BY
ATTORNEY

TELEPHONE SYSTEM

Original Filed July 3, 1929 4 Sheets-Sheet 3

INVENTOR
T. S. SKILLMAN
BY
M. P. McKenney
ATTORNEY

INVENTOR
T. S. SKILLMAN
BY M. B. McKenney
ATTORNEY

Reissued Oct. 22, 1935 Re. 19,741

UNITED STATES PATENT OFFICE 19,741

TELEPHONE SYSTEM

Thomas S. Skillman, Aldwych, London, England, assignor to Western Electric Company, Incorporated, New York, N. Y., a corporation of New York Original No. 1,763,013, dated June 10, 1930, Serial No. 375,715, July 3, 1929. Application for reissue June 3, 1932, Serial No. 615,258, and in Great Britain July 20, 1928

37 Claims. (Cl. 179—16)

This invention relates to telephone systems. In known telephone systems in which repeaters are provided for insertion into the lines which may require them, it is usual that either a repeater or a group of repeaters are permanently connected with the lines or that the insertion of the repeaters is controlled manually by an operator. In a further development, however, the insertion of the repeaters in the line may be effected partially by semi-automatic means as may be seen from U. S. Patent No. 1,708,982 Serial No. 39,882 filed June 27, 1925.

Among the disadvantages of systems of this type heretofore proposed was the impossibility of their ready adaption to purely automatic systems and one of the main objects of this invention is to overcome this limitation though as will be mentioned later the present scheme may also have advantages when used in connection with manual or semi-automatic systems.

A feature of the present invention is a system in which a repeater may be inserted into a line entirely automatically and according to the requirements of the line.

According to another aspect the invention may be regarded as a telephone system in which an established connection between two points is utilized for transmitting current for determining whether or not a repeater should be interconnected therebetween, this discrimination being utilized for automatically governing the insertion of a repeater.

According to another feature of the invention an alternating current is transmitted over the talking circuit for controlling the automatic insertion of a repeater in said circuit.

In accordance with still another feature of the present invention an alternating current is transmitted over the talking circuit to determine whether or not a repeater should be interconnected in said circuit. By using a combination of signals depending upon the individual transmission equivalent of the lines it is possible to initiate the selection and the insertion of a repeater in the circuit only if the combined transmission equivalent of the interconnected lines necessitates a repeater.

According to a further feature of the invention a discrimination is made between the nature of a plurality of lines (e. g. their attenuation characteristic or whether they are short or long lines etc.) by means of alternating current of different frequencies or of alternating current of different amplitude or of alternating current modulated or interrupted at different speeds.

A further feature of the invention provides facilities for using any one of a group of lines for repeater working and at the same time picking up one of a preferably much smaller group of balancing networks.

According to another feature or modification, a system is provided in which the connection of a repeater is controlled entirely by the line equipment and the repeater equipment so that any form of manual cord or automatic switch may be used in the connection.

According to another feature of the invention the line equipment individual to the transmission lines are adapted to perform the function of signaling, that is to say, to transmit dial impulses ringing currents etc., and also to control the insertion of a repeater in the transmission circuit. This is a very important feature of the present invention.

Another feature of the present invention resides in the provision of means for gain regulation which may be effected by means of an alternating current (e. g. voice frequency) transmitted over the signaling circuit for controlling the gain of the amplifier.

Other features of the invention will appear from the following description.

In the accompanying drawings:

Fig. 1 shows the signaling and line equipments at the incoming end of a toll line;

Fig. 2 shows an operator's cord circuit;

Fig. 3 shows the signaling and line equipments at the outgoing end of a toll line;

Figure 4:
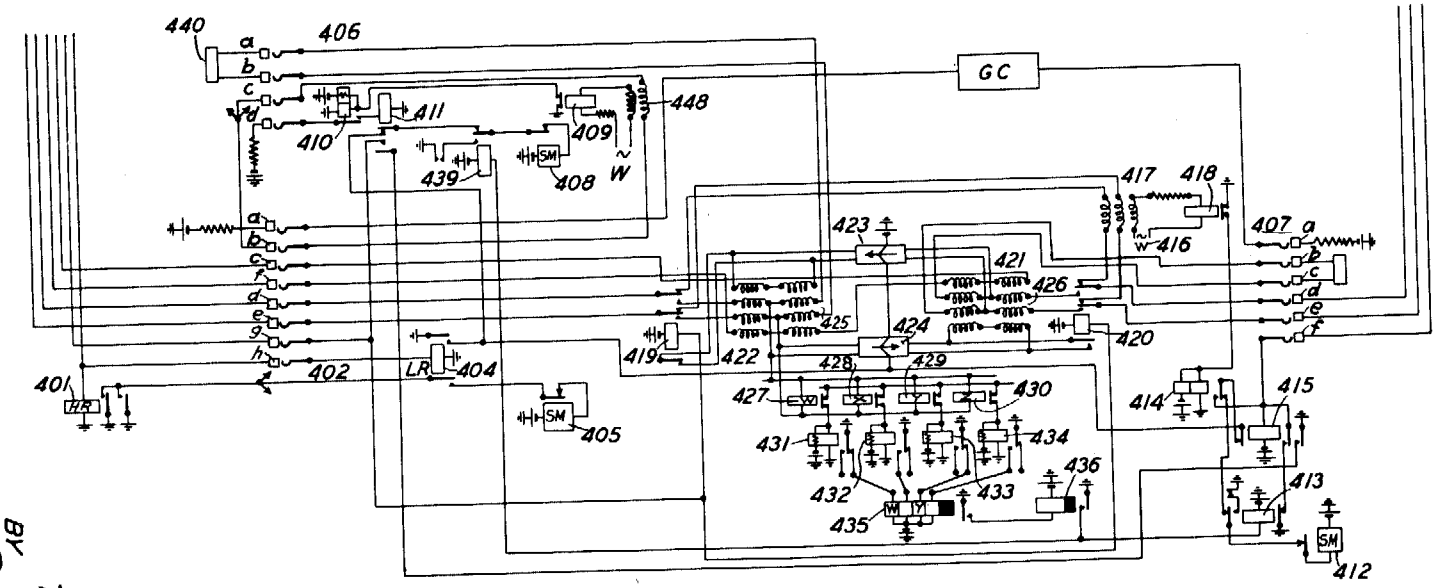
Fig. 4 shows the equipment associated with the repeater.
Figure 5:
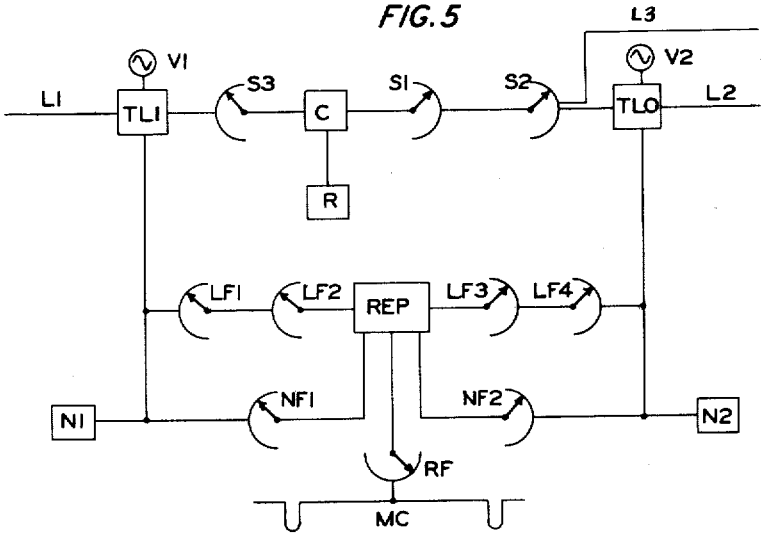
Fig. 5 shows schematically an arrangement embodying the invention for switching a toll line L1 to a toll line L2 over automatic switches S1, S2 and S3.
Figure 6:
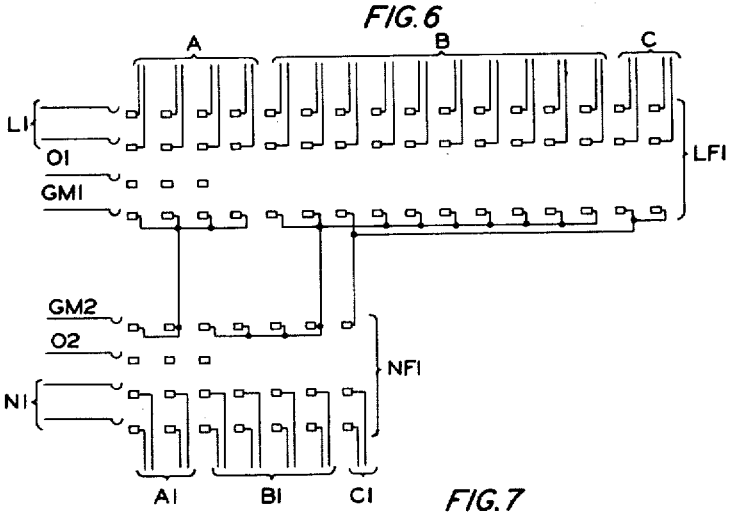
Fig. 6 illustrates a detail of the system shown in Figs. 1 to 4.

In the drawings Figs. 1 to 4 show the detailed circuit of a particular embodiment of the invention and Figs. 5 and 6 are simplified diagrams illustrating the working of the circuit.

Considering first Fig. 5, this shows equipment located at a central office upon which converge a number of long telephone lines referred to as toll lines. These toll lines are used for traffic into and out of the central office and its local area, and are also used for traffic through this area. In the latter case two or more toll lines will be connected in tandem and since in most cases this will cause a high attenuation of the speech currents, a repeater will be necessary between the two lines.

*General*

In Fig. 5 two such lines L1 and L2 are shown connected together by means of a finder switch S3 and selectors S1 and S2. These will be controlled by dialing impulses received over the line either directly or by means of a register such as R which is connected by the circuit C. Alternatively an operator's cord circuit may be used to connect the two lines L1 and L2. TL1 and TL0 represent the special line equipment necessary to control the insertion of the repeater. They are individual to each line.

In the detailed circuit which illustrates the invention it is assumed that these equipments TL1 and TL0 are used also for signaling over the lines themselves and a simple arrangement is shown combining the two functions. It should be pointed out, however, that the use of the signaling apparatus for controlling a repeater, although a valuable feature, is not essential and separate equipment for the repeater control may be used.

The equipment TL1 and TL0 may include devices responsive to alternating current, such as vacuum tube detectors, or voice frequency relays. Signaling between TL1 and TL0 is used to decide whether a repeater is necessary, the alternating current devices discriminating between alternating currents of different character which are transmitted between TL1 and TL0 over the talking circuit. In the embodiment of the invention which is shown in Figs. 1 to 4 voice frequency relays are used, and the discrimination is obtained by using different frequencies, but alternative methods such as the use of different amplitudes or of interruptions at different speeds will readily occur to those skilled in the art.

The exact sequence of operations whereby TL1 and TL0 signal to each other to determine whether a repeater shall be connected may be varied considerably to suit individual cases. The preferred arrangement is for TL0 to send a pulse signal to TL1 and if this signal is such that a repeater is needed TL1 initiates the operation of connecting the repeater. This pulse may be sent at any time when a talking circuit between the two line equipments is assured and the simplest way of providing for this is to wait until the called subscriber replies, since a talking current between TL1 and TL0 will always be present at this time whether manual or automatic connections are used. The attenuation of the two lines for operators' conversations occurring before the subscriber replies will not be excessive, owing to the absence of subscriber loops and the slight delay before the called subscriber is able to talk, would not be noticed.

An alternative arrangement would be for TL0 to send out tone continuously until the called subscriber replies, and for TL1 to respond to this and to pick up the repeater. In automatic equipment where the talking circuit could easily be made continuous by the addition of suitable small condensers, TL0 could send out a pulse or pulses immediately it is picked up and this would be sure to reach TL1, but where operators may interrupt the connecting circuit this can not be done. Another plan would be for TL1 to send a pulse or a continuous tone to TL0 and for TL0 to pick up the repeater first. Other arrangements such as starting the signal from TL0 by a preliminary pulse from TL1 received only when the connection is completed, will readily occur to those skilled in the art and need not be elaborated.

Returning, however, to the preferred method of signaling between the line equipment, it is assumed that TL0 sends a signal to TL1 to initiate the insertion of the repeater. If TL0 is a line of high attenuation which will require a repeater whenever connected to another toll line, a signal (B) will be sent. If, however, it is a comparatively short line with low attenuation a repeater may be needed only when other lines of high attenuation are connected and in this case TL0 sends out a signal (A). The equipment in TL1 will be arranged to respond, therefore, either to signal (B) or to signals (A) and (B) depending on the attenuation of the line L1 and thus a discrimination is obtained between connections which require repeaters and connections which do not.

Connections which do require repeaters may themselves require different gains and the arrangements for providing this are described later.

The response of the apparatus TL1 causes it to pick up a free repeater over the line finders LF1 and LF2 (for smaller groups of lines, of course, only one finder will be required). The repeater apparatus REP must then pick up the line L2 over the finders LF3 and LF4 and special arrangements will be needed to do this since it will not be normally possible to provide a special marking circuit over the automatic switches or the cord circuit connecting TL1 and TL0. It would of course be easy to do this by providing special cord circuits or special automatic switches but such an arrangement is extremely uneconomical, in view of the small number of connections which require repeaters. Accordingly the marking of L2 from REP is carried out over LF1, LF2, TL1, S3, C, S1, S2 and TL0 by means of voice frequency current. This arrangement will of course be independent of the type of connecting circuit between TL1 and TL0 since a talking circuit will always exist between these two points.

An arrangement is described in connection with Figs. 1 to 4 whereby a number of repeaters may be allowed to hunt simultaneously without fear of cross connections. By this arrangement when the correct contact is reached a short circuit is placed on the secondary of a transformer. This transformer has a voice frequency relay in its primary circuit and the short circuit increases the current in this circuit sufficiently to operate the relay and thus to operate a direct current relay to stop the switch. It is obvious that the short circuit can only be effective over the correct connection and not over cross connections. In cases where prevention of cross connection is not required, as in very small offices, the voice frequency relay may be connected directly in the talking circuit.

As several types of toll lines L1 and L2 may be connected to the repeaters it is necessary to provide balancing networks N1 and N2 suitable for balancing each type of toll line. This is achieved in the arrangement of Fig. 5 as follows: As soon as the repeater has picked up a line, a suitable balancing network is also picked up over NF1 or NF2. Automatic methods well known in the art may be applied to this, a simplified arrangement being shown diagrammatically in Fig. 6 and in detail in Fig. 4. Referring to Fig. 5 all the toll lines which require similar networks are arranged to mark a common terminal in network finders NF1 or NF2, which are associated with the corresponding group of networks. An individual network of the group is then picked up by the network finder.

It will be seen that trouble from cross connection may arise in the network selection. This may be overcome either by using the voice frequency selection already provided for in the repeater or by any well known method used in automatic telephony. For instance, a master switch may be provided for distributing the repeaters, thus only permitting one repeater to hunt at a time.

More specifically in Fig. 6 the banks of contacts of line finder LF1 and of network finder NF1 are shown. A group of toll lines connected to line finder LF1 are divided into groups, for instance in three groups A, B, C to which correspond on the network finder NF1 three groups A1, B1, C1 of suitable balancing networks. In this figure, L1 leads to the line circuit of the repeater, N1 is connected to the network circuit of the repeater, while O1 and O2 are the test brushes and GM1 and GM2 are the brushes used for selecting the required group of networks. Marking potential applied by way of GM1 from the repeater enables NF1 to pick up the required group of networks by means of brush GM2 and then to select an idle network by means of brush O2.

Returning to Fig. 5, the stage has now been reached where L1 and L2 are connected by way of the repeater REP, and balancing networks N1 and N2 for these lines have been picked up. The switching apparatus associated either with REP or with TL1 or TL0 now operates to release the switches S1, S2 and S3, and conversation may then proceed in the normal way over the repeater. Release of the repeater may be controlled from the distant end by means of TL1 or by a local operator, where the original connection was completed manually.

MC represents an operator's cord circuit which in some cases would be used to connect the lines L1 and L2 instead of the automatic switches shown to the top of the figure. In this case it would be necessary sometimes to give the operator direct control of the repeater and this could be done by means of the finder switch RF. The repeater would mark the cord circuit either by means of voice frequency current or direct current over the junction from LF1 to TL1 and the finder switch RF would then hunt for the marked cord circuit and would connect the control circuits of the repeater through to this cord circuit. Alternatively the control circuits of the repeater could be carried over the junction from LF1 to TL1 to the cord circuit MC. The method to be adopted would depend of course upon the facilities which it is required to give to the operator controlling the cord circuit MC.

Figure 7:
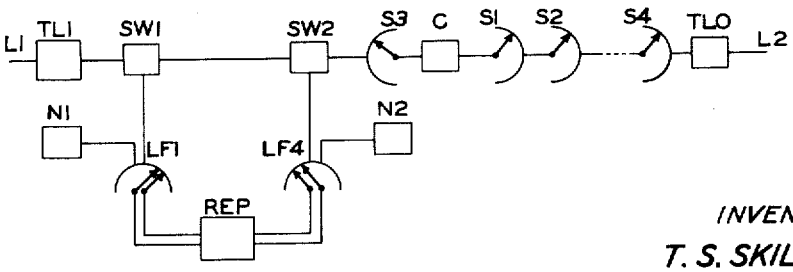
Fig. 7 shows a method of applying the invention for controlling a repeater over a junction circuit.

In large areas such as the London area, incoming and outgoing toll lines may be located in different places through calls being connected either manually or automatically over a junction circuit. It will be clear that in this case the arrangements described above may be used. A typical instance is shown in Fig. 7 in which a repeater may be connected in series with the existing connections instead of in shunt. As before, signaling between the line equipment of the incoming and outgoing lines is carried out over the talking circuit and a repeater is connected when required.

Fig. 7 shows a method of working over a junction circuit utilizing the principle of controlling the repeater connection by the line equipment and using the interconnecting talking circuit to provide signaling between the line equipments. The operation of the arrangements of Fig. 7 is as follows: L1, L2, TL1, TL0, S3, S1, S2, C, N1, LF1, LF4 and REP are the same as before L2, however, is now reached over a junction circuit and switch S4, and the repeater REP is connected in series with the connection. A compromise network N2 is used for balancing the lines over LF4. SW1 and SW2 are relay groups to introduce the repeater. Signaling between TL1 and TL0 takes place as before and TL1 picks up the repeater.

Other modified methods of applying the same principles for connecting the repeater into the circuit will occur to those skilled in the art.

Turning now to the circuits shown in Figs. 1 to 4, the arrangement shown has been made as simple as possible in order not to complicate the description of the invention by irrelevant circuit details which will be readily familiar to any one skilled in the art. The toll lines therefore are shown connected over an operator's cord circuit since the nature of the invention may be ascertained in a simpler manner in this case than in the case where automatic switches are used.

Fig. 1 shows the signaling equipment at the incoming end of toll line 101 which is connected to an operator's cord circuit shown in Fig. 2. The operator in this case is a switching operator who connects through to any required exchange requested by the operator at the distant end of the line 101. Fig. 3 shows the signaling equipment at the outgoing end of line 301 which is operated on the same basis as the line 101. Fig. 4 shows the equipment associated with a repeater in order that a connection between the lines 101 and 301 may be made by way of repeaters when necessary.

*Operation of the arrangements*

The method of working used by the operators is as follows:

The operator at the distant end of the line 101 plugs into the line and thus lights the switching operator's lamp 201. The switching operator then enters the circuit by throwing her key 202 and plugs the line through to the required exchange. In most cases this will be over comparatively short lines to local subscribers and no repeater will be needed. In this case when the subscriber replies a signal is sent back over the line 101 to extinguish the distant supervisory lamp, thus to inform the operator. When the subscriber releases at the end of a cell a further signal is sent back to light the supervisory lamp and the distant operator then pulls out the plug to release the connection. The removal of the plug sends back a signal to the switching operator of Fig. 2 by lighting lamp 201 and the operator then pulls out her plug and the line is ready for another call.

If the request from the originating operator involves extending the call over another long line the switching operator plugs into this line and the train of operations are repeated, another operator being called at the distant end, the subscriber replying and eventually releasing and then the originating operator and the switching operators taking down as before. The line 301 used in this case will of course be available also for local calls, so that a control operator similar to the operator at the distant end of the line 101 as well as the switching operator may pick up the line 301 and complete calls over it. Fig. 3, therefore, with the omission of the special relays used for introducing the repeater, represents also the equipment at the outgoing end of line 101, while Fig. 1 gives a good idea of the equipment which will be located at the distant end of line 301.

Consider now the method of working in the case where the switching operator of Fig. 2 is replaced by automatic apparatus. In this case the distant operator on 101 plugs into the line and this prepares the automatic apparatus. She then dials or key-sends to set up a connection either to a subscriber in the local area or to a subscriber obtained over a distant line such as 301. Supervisory signals are received back from the subscriber in the usual manner, and at the conclusion of the call the originating operator takes down and the automatic apparatus then releases. It will be seen that the cycle of operations is just the same as in the case described above where a switching operator is used in place of the automatic apparatus.

*Operation without repeaters*

Considering now the detailed operation of the circuit, four voice frequency relays 102, 103, 104 and 105 are bridged across the incoming end of line 101 and when these are operated by received pulses of voice frequency current they operate the corresponding relays 106 to 109. These relays are associated with coding relays 110 to 113 which are released only when certain combinations of the four voice frequency relays are operated for a given time. For this reason the coding relays are made slow to release and are connected in the circuit shown. The operation of this circuit will be clear upon inspection. The four voice frequencies which are used in the signaling apparatus are indicated by the letters W, X, Y and Z and relays and supply circuits which are associated with definite frequencies are marked with these letters.

The signaling code is summarized below:

| | |
|---|---|
| Call | WX |
| Clear | WY |
| Extinguish supervisory lamp | WX |
| Light supervisory lamp | WY |
| Cord circuit repeater signal for long line | WZ |
| Cord circuit repeater signal for short line | XZ |

When the distant operator plugs into the line 101 a short pulse of the combination WX is sent and this releases relay 112 and thus locks up relay 114 over a circuit controlled by relay 113, which is the release relay. Relay 114 closes a circuit over its front contact and the back contact of 115 to light the lamp 201. The switching operator then takes the number of the wanted line and plugs into the required line.

When the called subscriber replies the supervisory relay 116 is energized and closes a circuit to energize relay 117. The type of junction signaling used and hence the connections of relay 116 vary widely, but in all cases some supervisory relay is provided for control by the subscriber's switchhook.

Relay 117 is arranged to send a pulse of voice frequency current out of one combination on to the line whenever it energizes and to send a different pulse every time it releases, these pulses being used to control the distant supervisory lamp. The circuit effecting this consists of relays 118, 119, 120, 121 and 122. The energization of relay 117 opens the circuit of relay 118 but this is slow to release and thus a circuit is maintained for a short time over its front contact to energize relay 120. Relay 120 energizes relay 122 over an obvious circuit and connects the frequencies WX to the line 101. Similarly, the release of relay 117 closes the circuit for relay 121 until relay 119 releases and thus the combination WY is sent over the line to light the supervisory lamp. C is the common lead from the generator (not shown) of the frequencies W, X, Y and Z.

The supervisory relay 116 with its associated sending relays is used also to flash the distant supervisory lamp when the called subscriber is busy, and in this case any of the well known arrangements may be used to deal with busy condition. At the conclusion of the conversation, relay 116 releases, the distant supervisory lamp lights, the originating operator takes down and thus a pulse of voice frequency current is received to operate relays 102 and 104. This releases 113 and hence 114, and this closes the circuit for lamp 201 over the front contact of relay 115 and thus tells the switching operator to release the connection. The removal of the plug from the jack releases 115 and thus extinguishes 201.

The above description assumes that no repeater was necessary. Similar conditions for line 301 will now be described. This is the case when line 301 is picked up by an originating operator directly and not over another long line.

The cord circuit in this case will not be the same as that shown in 202 but in every case a sleeve circuit will be available to energize the relay and also a form of supervisory relay will be present in the cord. The particular arrangements postulated are shown in the drawings but it will be clear that any known method of signaling can be used. The jack 203, or more probably another jack in parallel with 203 on the other operator's position, will be picked up to call the distant switching operator or to prepare distant automatic apparatus. This will energize relay 302 and will cause the circuit consisting of relays 303, 304, 305, 306 and 307 to function in precisely the same way as the corresponding relays in Fig. 1. A short pulse of the combination WX is thus sent out on the line. These sending relays are operated when the line is released to send the combination WY to give a release signal at the distant end. The relays 308 to 317 are similar to the corresponding relays in Fig. 1, relay 316 being released by the combination WX received over the line to extinguish the supervisory lamp and relay 317 being released by the combination WY to light the supervisory lamp. The releasing of relay 316 locks up relay 318 under the control of 317. Relay 318 places battery and earth on the tip and ring to energize the supervisory relay corresponding to relay 116.

*Operation with repeaters*

The energization of 318 when the called subscriber replies also energizes 319 for a short time until the slow release relay 320 releases. Relay 319 during energization places voice frequency currents back on to the jack 203. This current will be at a very low level and will occur only for a very short time so that it will not be noticed appreciably by the called subscriber who is waiting on the line. Its function is to operate the signaling apparatus of any other connected toll line in order to introduce the repeater. Thus if line 301 is connected to a local circuit nothing happens. If, however, the connection is to another long line such as 101 the signaling relays in this line are operated. Line 101 is assumed to be a long line which has a high attenuation and which therefore needs a repeater when connected to any other long lines. It is provided consequently with two relays 110 and 111 which respond to either signaling code. Line 301 is assumed to be a short line and therefore sends out combination XZ. If 101 were also a short line relay 110 would not be provided and therefore no repeater would be inserted, but since it is a long line it responds to either XZ or WZ, the release of either 110 or 111 thus functioning to lock up 123. Relay 123 places battery on the starting circuit of the finder switch 402; this energizes the high resistance relay 401 to start all the free finder switches such as 402 hunting for a line. When a finder reaches the line, relay 404 in its associated repeater circuit is energized. This relay opens the stepping magnet 405 to stop the finder. It also shunts relay 401 and the latter falls off to stop the other finders hunting. Relay 404 places earth on a circuit to start the network finder 406 and the other line finder 407 searching for network 440 and for line 301 respectively. The stepping magnet 408 on the network finder is energized over an obvious circuit and the finder 406 hunts until the first of the terminals marked on brush *b* of 402 is reached. At this point the transformer 448 is short-circuited and the current in its primary is thus increased sufficiently to operate the voice frequency relay 409. This in turn operates 410 and thus prepares the test circuit which enables the switch to hunt for a free network in the group. The free network is indicated by battery potential on the brush *d* of the finder 406 and this energizes relay 411 to open the stepping circuit. The low resistance relay 411 renders the circuit busy. Any standard circuit stopping the switch when all networks in the group are busy, can be used (e. g., last contact to have permanent battery).

Meanwhile switch 407 has been hunting for line 301, the stepping magnet 412 being energized over a circuit via the contacts of relays 413, 414, and 415 to ground from relay 404. The ground from relay 404 also closes the filament circuit of the repeater.

The line 301 is marked on brushes *d* and *e* of 407 by the voice frequency current applied from the source 416 through the transformer 417 to brushes *d* and *e* of 402 and thence to the line circuit of 101, plug 204, jack 203, line circuit of 301. When the correct terminals are found relay 418 operates and energizes relay 414 to open the stepping circuit and the repeater is then completely connected.

No separate network selector is shown on this side in order to illustrate the method of operatoin which would be used if individual networks for each line were provided.

The use of the transformers 448 and 417 to control the hunting of 406 and 407 is in order to avoid cross connection between hunting switches. The voice frequency current in the primary circuit will only increase sufficiently to operate the relays on a complete short circuit and not on a cross connection. Other means are available for carrying this out on finder 406 but the described method is probably the most satisfactory way in the case of switch 407. If the transmission bridges in Figs. 1, 2 and 3 are of the repeating coil type an effective short circuit can still be obtained by a proper poling of the connections.

Relay 414 operates and energizes relay 415 which locks up over a contact of relay 413 to maintain the stepping circuit open after the release of 414 and also to switch in the repeater. The latter is done by earth from 415 over the contact of relay 411 to brush *g* of finder 402, to relay 419, and to relay 420. Relays 419 and 420 remove the voice frequency testing circuit of transformer 417 from the line and connect in the repeater at the same time removing short circuits designed to prevent one repeater from singing. Earth over brush *g* of switch 402 energizes relay 124 to remove the signaling apparatus from line 101 (in order to reduce unbalances and to prevent false operation of the apparatus by high level currents from the repeater) and connects through the line circuit from the operator's position to the monitoring windings 421 and 422 of the repeater. The operator can thus listen and talk over the circuit just as if the repeater were not connected. In fact she will be unaware that a repeater has been inserted. In a similar way the signaling apparatus in Fig. 3 is cut out by energization of relay 321, by earth from contact of relay 413.

The repeater consists of two amplifiers 423 and 424 together with two hybrid coils 425 and 426 of which the windings 421 and 422 form a part. The operation of this arrangement is familiar to those skilled in the art.

When the repeater is inserted the voice frequency signals coming in from 301 are transmitted direct through the repeater and are no longer relayed over the switching channel of Fig. 2. The signal which indicates the reply of the called subscriber is however transmitted over the regular channel in the way already described, during the time that the selection of the repeater is in progress.

At the end of the conversation the distant operator releases the circuit by removing her plug. This sends out a pulse of voice frequency current which energizes the signaling relays 427 to 435 in the manner described for similar relays in Fig. 1, and thus energizes relay 436. It will be clear that the signaling relays of Fig. 1 could be connected in place of relays 427 to 435 by providing extra brushes on switch 402. Relay 436 maintains earth on a common lead for a short time to energize relays 413 and 439. Relay 413 unlocks 415 and removes earth from brush *f* of switch 407 to release relay 321. It also closes the circuit of magnet 412 over the off-normal springs and the switch returns to normal. The release of relay 415 removes earth from brush *g* of switch 402 and from relays 419 and 420. The repeater thus returns to normal and relay 124 is also released thus opening the energizing circuit of relay 404.

The previous energization of relay 124 had released relays 114 and 123. Lamp 201 lights owing to the release of relay 125 which was energized when relay 124 operated. The switching operator then removes her plug and relay 115 releases and the circuit is ready for another call.

The removal of the plug from jack 203 sends out a releasing signal over line 301 in the manner already described.

Figure 8:
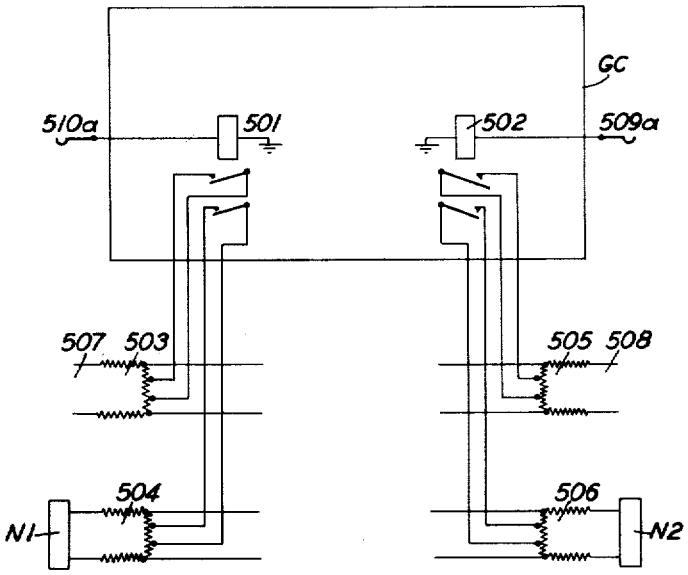
Fig. 8 shows in more detail a part shown schematically in Fig. 4.

The invention enables one to use gain regulation apparatus for controlling the amplification of the repeaters. This may be accomplished by means of the apparatus GC adapted to be connected over brush *a* of switch 402 to battery and earth and also to battery and earth over the brush *a* of switch 407. The gain control apparatus GC is shown more clearly in Fig. 8.

The gain control apparatus comprises in this case two relays 501 and 502 connected to ground. Resistance pads 503 and 504 are connected in the line 507 (corresponding with line side of coil 425 of Fig. 4) and to the balancing network N1 (corresponding with the network connected to the other side of coil 425 of Fig. 4). Similarly resistance pads 505 and 506 are connected with the line 508 and network N2 corresponding respectively with the line and network of coil 426, Fig. 4.

The contacts of relay 501 are adapted to short-circuit part of the networks 503 and 504 so as to vary the attenuation of the currents passing through the line. Similarly the pads 505 and 506 may be varied by the closing of the contacts of relay 502. The energization of relays 501 and 502 depends upon whether the connections at 510*a* (corresponding with 402*a*, Fig. 4) and 509*a* (corresponding with 407*a*, Fig. 4) respectively, are over battery and ground or are left blank. Thus relays 501 and 502 are energized or not energized according to the gain required which depends upon the particular circuits which are to be established. It is preferable to use a plurality of relays such as 501 and 502 and to provide, say three different attenuating values, this being effected preferably by arranging marginal relays to operate on different energizing currents so that the selection of a particular attenuating pad depends upon the magnitude of such currents. This will be obvious to one skilled in the art after persuing the above and it must be understood that the simple arrangement has been shown to enable the invention to be made clear.

An alternative may be effected by placing the resistance pad in the line connected to contacts *d, e* of switch 407 of Fig. 4. In this case the gain control apparatus GC and its circuits may be omitted. The establishment of the circuits over the contacts *d, e* of switch 407 depends upon the type of line connection to be effected and the pad would be such that it gives the correct attenuation for that particular line. A similar pad would be provided in the leads to the network over contacts *b, c* so that a proper balance is maintained.

Similar attenuation pads may be connected to the switch contacts 402 in an analogous manner so that the gain for circuits in the other direction may be adjusted similarly.

Gain control by voice frequency means can be provided under control either of the originating operator or the switching operator. Either operator may be provided with a key or keys which place a certain combination or a number of combinations of voice frequency currents upon the calling circuit to operate the relays 102, 103, 104 and 105 or the relays 427, 428, 429 and 430. This will release a relay similar to relays 110 to 113 or 435 and will operate the gain control circuits in the repeater. If the signaling equipment of Fig. 1 is used, this of course, will be done over a brush of finder 402.

In the above arrangement it will be noticed that the connection of the repeaters is controlled entirely by the line equipment and the repeater equipment so that any form of manual cord or automatic switch may be used in the connection. The present invention permits the use of a common group of repeaters for a large number of lines incoming to the station.

The circuits of Figs. 1 to 4 show only one finder on each side of the repeater. The use of two finders in succession to deal with a larger number of lines presents no novel features and various methods of carrying out the connection will be familiar.

In the case where the connecting circuit of Fig. 2 consists of automatic equipment it will be clear that the operation of relay 124 or any similar part of the circuit could be used to release this apparatus and make it available for other calls.

Although the invention has been described in connection with embodiments wherein alternating current such as voice frequency currents are used for controlling the insertion of a repeater in a transmission circuit it will be clear to those skilled in the art that other signaling currents may be used for the above purposes, for instance direct current or direct current impulses may be employed instead of alternating current when the connecting circuit permits. Likewise modulated or interrupted alternating currents may also be used with considerable advantages in some cases.

What is claimed is:

1. In a telephone system, lines each including a pair of talking conductors, means for interconnecting said lines, a repeater, and means controlled over the talking conductors of an established connection between two of said lines for inserting said repeater in said established connection.

2. In a telephone system, lines, means associated with each of said lines for selectively transmitting and receiving alternating currents of different frequencies over the talking conductors thereof, means for interconnecting said lines, a repeater, and means selectively responsive to said alternating currents controlled over the talking conductors of an established connection between two of said lines for inserting said repeater in said established connection.

3. In a telephone system, lines of different character, means associated with each of said lines for transmitting alternating currents corresponding to the characteristics of said lines over the talking conductors thereof, means for interconnecting said lines, repeaters, and means responsive to said alternating currents controlled over the talking conductors of an established connection between two of said lines for selecting and inserting one of said repeaters in said established connection.

4. In a telephone system, lines of different character, means associated with each of said lines for transmitting alternating currents corresponding to the characteristics of said lines over the talking conductors thereof, repeaters, means for interconnecting said lines, and means responsive to said alternating currents controlled over the talking conductors of an established connection between two of said lines for selecting one of said repeaters, for adjusting said selected repeater, and for inserting said selected and adjusted repeater in said established connection.

5. In a telephone system, lines of different character, means associated with each of said lines for transmitting and receiving alternating currents of different frequency over the talking conductors thereof, each said means being arranged to transmit alternating currents corresponding to the characteristics of the said associated line, means for interconnecting said lines, repeaters, and means responsive to alternating currents transmitted by one of said lines over an established connection to another of said lines and received by the said other said line for selecting one of said repeaters and inserting it in said established connection.

6. In a telephone system, an incoming line, an outgoing line, means for interconecting said lines, a plurality of repeaters, switching means for each repeater for connecting with said lines, means responsive to the interconnection of said lines and controlled over the talking conductors of said lines for initiating the operation of said switching means, and means responsive to the connection of one of said repeaters with said lines for closing the talking connection between said lines through said repeater.

7. In a telephone system, lines each including a pair of talking conductors, means for interconnecting said lines, a plurality of repeaters, switching means for connecting said repeaters with said lines, means controlled over the talking conductors of an established connection between two of said lines for initiating the operation of said switching means, and means responsive to the connection of one of said repeaters with said interconnected lines for inserting said one of the repeaters in the talking connection between said lines.

8. In a telephone system, lines each including a pair of talking conductors, means for interconnecting said lines, a plurality of repeaters, an incoming and an outgoing switch for each of said repeaters, means controlled over the talking conductors of an established connection between two of said lines for starting said incoming switches to connect with one of said two lines, means responsive to the connection of one of said repeaters with said one of the two lines for starting the operation of the outgoing switch of said one of the repeaters to connect with the other of said two lines, and means for inserting said one of the repeaters in said established connection.

9. In a telephone system, lines each including a pair of talking conductors, means for interconnecting said lines, a plurality of repeaters, an incoming and an outgoing switch for each of said repeaters, means controlled over the talking conductors of an established connection between two of said lines for starting said incoming switches to connect with one of said two lines, means responsive to the connection of one of said repeaters with said one of the two lines for starting the operation of the outgoing switch of said one of the repeaters, means controlled over the talking conductors of said established connection for stopping the operation of the outgoing switch of said one of the repeaters to connect with the other of said two lines, and means for inserting said one of the repeaters in said established connection.

10. In a telephone system, lines each including a pair of talking conductors, means for interconnecting said lines, a plurality of repeaters, a plurality of balancing networks for use with said repeaters, an incoming and an outgoing switch for each of said repeaters, means controlled over the talking conductors of an established connection between two of said lines for starting said incoming switches to connect with one of said two lines, means responsive to the connection of one of said repeaters with said one of the two lines for starting the operation of the outgoing switch of said one of the repeaters to connect with the other of said two lines, means for selecting one of said networks for use with said one of the repeaters to balance said one of the two lines, and means for inserting said one of the repeaters in said established connection.

11. In a telephone system, lines each including a pair of talking conductors, means individual to each of said lines for transmitting and receiving alternating currents of different frequencies, means for interconnecting said lines, a plurality of repeaters, an incoming and an outgoing switch for each of said repeaters, alternating current responsive means controlled over the talking conductors of an established connection between two of said lines for starting said incoming switches to select one of said two lines, means responsive to the connection of one of said repeaters with said one of the two lines for starting the operation of the outgoing switch of said one of the repeaters, alternating current responsive means controlled over the talking conductors of said established connection for stopping said outgoing switch to connect with the other of said two lines, and means for inserting said one of the repeaters in said established connection.

12. In a telephone system, lines each including a pair of talking conductors, means individual to each of said lines for transmitting and receiving alternating currents of different frequencies, means for interconnecting said lines, a plurality of repeaters, an incoming and an outgoing switch for each of said repeaters, alternating current responsive means controlled over the talking conductors of an established connection between two of said lines for starting said incoming switches to select one of said two lines, means responsive to the connection of one of said repeaters with said one of the two lines for starting the operation of the outgoing switch of said one of the repeaters, means for stopping said outgoing switch to connect with the other of said two lines, said stopping means comprising a relay in circuit with a source of alternating current and one winding of a transformer, the other winding of said transformer being included in a circuit adapted to be closed through the talking conductors of said established connection.

13. In a telephone system, an incoming line, an outgoing line, automatic switches controlled over said incoming line for interconnecting said lines, an amplifying device, and means responsive to said interconnection for directly connecting said lines through said amplifying device and for releasing said automatic switches.

14. In a telephone system, an incoming line, a plurality of outgoing lines of two classes, a train of automatic switches controlled over said incoming line to select any one of said outgoing lines, an amplifying device, and means effective only if the selected line is of a particular class for substituting said amplifying device for said train of automatic switches.

15. In a telephone system, a plurality of incoming lines divided into two classes, an outgoing line, a train of automatic switches controlled over a calling incoming line to connect with said outgoing line, an amplifying device, and means effective only if said calling line is of a particular class for substituting said amplifying device for said train of automatic switches.

16. In a telephone system, an incoming line, a plurality of outgoing lines divided into two classes, automatic switches controlled over said incoming line for selecting any one of said outgoing lines, an amplifying device, and means effective if the selected line is of a particular class for inserting said amplifying device in the connection between the incoming and the selected outgoing line.

17. In a telephone system, a plurality of incoming and outgoing lines, means controlled over a calling incoming line for connecting the line to one of said outgoing lines, discriminating means associated with certain of said lines having predetermined characteristics, a repeater, and means controlled by said discriminating means and effective only if both of said interconnected lines are of said characteristics for automatically including said repeater in said connection.

18. In a telephone system, a plurality of incoming and outgoing lines divided into two classes, a train of automatic switches operated over a calling incoming line to connect with one of said outgoing lines, a plurality of common link circuits each comprising a repeater and two finders, means effective only if both of the connected lines are of a particular class for associating an idle link circuit with said connection, and means for operating said two finders to connect with the incoming and the outgoing line, respectively, thereby completing said connection through said repeater.

19. In a telephone system, a plurality of incoming and outgoing lines divided into two classes, a train of automatic switches operated over a calling incoming line to connect with one of said outgoing lines, a plurality of common link circuits each comprising a repeater and two finders, means effective only if both of the connected lines are of a particular class for associating an idle link circuit with said connection, means for operating said two finders to connect with the incoming and the outgoing line, respectively, thereby completing said connection through said repeater, and means for thereafter releasing said train of automatic switches.

20. In a telephone system, a plurality of incoming and outgoing lines divided into two classes, automatic switches controlled over a calling incoming line to connect with one of said outgoing lines, a plurality of common link circuits each including a repeater, and means operative only if both of the connected lines are of a particular class for replacing said automatic switches with an idle one of said link circuits to connect said lines.

21. In a telephone system, a plurality of lines, automatic switches controlled over a calling line for connecting said line to a desired called line, a plurality of common repeaters, and means responsive to said connection for inserting an idle one of said repeaters in the connection between the calling and called lines.

22. In a telephone system, a plurality of lines, automatic switches controlled over a calling line for connecting said line to a desired called line, a plurality of common repeaters, and means responsive to said connection for connecting the calling and called lines through an idle one of said repeaters and for releasing said automatic switches.

23. In a telephone system, incoming lines, outgoing lines, means for extending a connection from an incoming line to an outgoing line, repeaters, means for automatically inserting one of said repeaters in said connection, balancing networks of different characteristics and common to said lines and said repeaters, and means for selecting a network suitable for balancing said incoming line for use with said repeater.

24. In a telephone system, groups of incoming lines, outgoing lines, means for extending a connection from any one of said incoming lines to one of said outgoing lines, groups of networks one for each of said groups of incoming lines, the networks of each group being designed to balance a line of the corresponding group of lines, repeaters, automatic switching means for inserting one of said repeaters in a connection between an incoming line and certain of said outgoing lines, and means for selecting one of the networks in the group corresponding to said incoming line for use with said repeater.

25. In a telephone system, lines, a repeater, automatic means for connecting two lines through the repeater, a plurality of different networks, and means responsive to the connection of said lines for selecting and connecting a suitable one of said networks with said repeater.

26. In a telephone system, a calling line, a called line, a repeater associated with the called line, a plurality of different networks, means for connecting said lines through the repeater, and means responsive to electrical conditions individual to the calling line for selecting one of said networks particularly suitable for the balancing of said calling line.

27. In a telephone system, incoming lines of different transmission characteristics, an outgoing line, a switch, a voice frequency repeater having its outgoing side connected to the outgoing line and its incoming side connected with said switch, a plurality of different line compensating networks for use with the incoming side of said repeater, a line compensating network connected in the outgoing side of said repeater, and means responsive to the seizure of an incoming line for actuating said switch to connect said incoming line with the incoming side of said repeater and for associating a suitable one of said different line compensating networks with the incoming side of said repeater.

28. In a telephone system, lines, repeaters, a plurality of different balancing networks, and automatic means for connecting two lines through a repeater and for selecting from said different networks suitable networks for balancing said lines.

29. In a telephone system, lines, repeaters, automatic means for connecting two lines through a repeater, a plurality of different networks, and means responsive to the interconnection of said lines for selecting and connecting networks with said repeater suitable for balancing said connected lines individually.

30. In a telephone system, lines, repeaters, a plurality of different balancing networks, automatic means for connecting two lines through an idle one of said repeaters, and means for selecting, from said different networks, networks suitable for balancing said lines and for connecting said selected networks to said repeater.

31. In a telephone system, incoming lines, outgoing lines, a repeater, automatic means for connecting an incoming line to a desired outgoing line, means for inserting a repeater in said connection, a plurality of networks of differing characteristics for balancing the different lines, and means responsive to the interconnection of said lines for selecting an idle one of the networks suitable for balancing one of said lines for use with said repeater.

32. In a telephone system, lines, a repeater, automatic means for connecting two lines through said repeater, a plurality of different networks for balancing the different lines, and means responsive to interconnection of said lines for selecting an idle one of the networks suitable for balancing one of said lines and for connecting said selected network to said repeater.

33. In a telephone system, incoming lines of different characteristics, outgoing lines of different characteristics, a repeater, means for connecting a calling one of said incoming lines through said repeater to a desired one of said outgoing lines, a plurality of networks of different characteristics for use in balancing said lines, and means responsive to the interconnection of said lines for selecting idle networks suitable for balancing said lines.

34. In a telephone system, incoming lines of different characteristics, outgoing lines of different characteristics, a repeater, means for connecting a calling one of said incoming lines through said repeater to a desired one of said outgoing lines, a plurality of networks of different characteristics for use in balancing said lines, and means responsive to the interconnection of said lines for selecting idle networks suitable for balancing said lines and for connecting said selected networks with said repeater.

35. In a telephone system, incoming lines, outgoing lines, a repeater, switching means for selecting and connecting to the incoming side of said repeater a calling one of said incoming lines, switching means for selecting and connecting to the outgoing side of said repeater any one of said outgoing lines, a plurality of balancing networks of different characteristics, and switching means operatively responsive to the connection of said repeater to an incoming line for selecting and connecting to said repeater a network suitable for balancing said calling incoming line.

36. In a telephone system, incoming lines, outgoing lines, a repeater, switching means for selecting and connecting to the incoming side of said repeater a calling one of said incoming lines, switching means for selecting and connecting to the outgoing side of said repeater any one of said outgoing lines, a plurality of balancing networks of different characteristics, and switching means operatively reponsive to the connection of said repeater to an outgoing line for selecting and connecting to said repeater a network suitable for balancing said outgoing line.

37. In a telephone system, incoming lines, outgoing lines, a repeater, switching means for selecting and connecting to the incoming side of said repeater a calling one of said incoming lines, switching means for selecting and connecting to the outgoing side of said repeater any one of said outgoing lines, a plurality of balancing networks of different characteristics, switching means operatively responsive to the connection of said repeater to an incoming line for selecting and connecting to said repeater a network suitable for balancing said incoming line, and switching means operatively responsive to the connection of said repeater to an outgoing line for selecting and connecting to said repeater a network suitable for balancing said outgoing line.

THOMAS S. SKILLMAN.